United States Patent Office 3,541,137
Patented Nov. 17, 1970

3,541,137
D-HOMO-B-NOR-ESTRIENES
Marinus Los, Trenton, N.J., assignor to American Cyanamid Company, Stamford, Conn., a corporation of Maine
No Drawing. Filed Feb. 27, 1968, Ser. No. 708,487
Int. Cl. C07c 171/06
U.S. Cl. 260—479                             9 Claims

ABSTRACT OF THE DISCLOSURE

This invention relates to novel steroid-like compounds which have utility as antiovulatory and estrogenic agents in treatment of warm-blooded animals and to a novel process for synthesizing said compounds.

BACKGROUND OF THE INVENTION

Kitahara, Yoshikosi and Oida in the "Tetrahedron Letters"; 1763 (1964) disclose the compounds spiro[1,3-dioxolane-2,1'(2'-H-naphthalen]-6'(7'H)-one, 3',4',8',8'a - tetrahydro - 7' - (hydroxymethylene)-5',8'a-dimethyl having the formula:

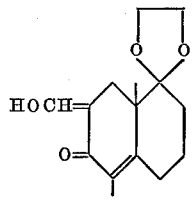

and 3',4',8',8'a-tetrahydro-5,8'a,-dimethyl-7'-(N-methylanilinomethylene) - spiro[1,3-dioxolane-2,1'(2'H)-naphthalen]-6'(7'H)-one having the formula:

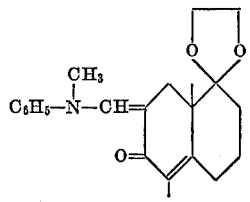

According to the publication, these compounds are intermediates in the total synthesis of dolarbradiene and no other activity for such compounds is provided or suggested.

BRIEF SUMMARY OF THE INVENTION

This invention relates to novel compounds represented by the Formulas a, b and c.

(a)
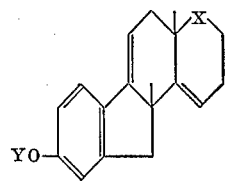

wherein X is a member selected from the group consisting of

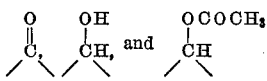

and Y is a member selected from the group consisting of $$H, -CH_3 \text{ and } -\overset{O}{\underset{\|}{C}}-CH_3$$

(b)
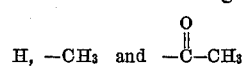

wherein X and Y are as described above, and (c)
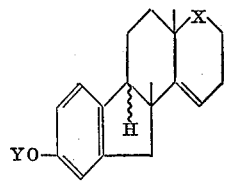

wherein X and Y are as described above and Z is H either cis or trans to the $C_{13}$ methyl.

This invention also relates to the use of said compounds as antiovulatory agents and estrogenic substances for the treatment of domestic and laboratory animals and to a process for the preparation of such compounds.

PREFERRED EMBODIMENT

In accordance with the invention, the enedione compound of Formula I, as shown in the synthesis diagram, hereinafter, is treated with sodium borohydride in the presence of an organic solvent such as ethanol to give the hexahydro-5β-hydroxy naphthalenone of Formula II. Treatment of the thus formed product with isobutylene or dihydropyran, preferably in the presence of an inert solvent such as tetrahydrofuran or methylene chloride and a strong acid catalyst such as hydrochloric acid, phosphorus oxychloride, sulfuric acid, p-toluene sulfonic acid or phosphoric acid saturated with boron trifluoride, yields the corresponding 5β-tetrahydropyranyloxy or 5β-t-butoxy-naphthalenone of Formula III. Where it is desirable to form the monoketal corresponding to Formula III, the enedione is subjected to selective ketalization with ethylene glycol in the presence of an acid such as p-toluene-sulfonic acid in an inert solvent such as benzene. Reaction of this monoketal with ethyl formate and an alkali metal lower alkoxide yields the 3-hydroxymethylene ketone of Formula IV. Similarly, treatment of the 5β-t-butoxy or 5β-tetrahydropyranyloxy naphthalenone of Formula III with the same reagents yields the corresponding 3-hydroxymethylene 5β-t-butoxy or 3 - hydroxymethylene-5β-tetrahydropyranyloxy naphthalenone of Formula IV. This hydroxymethylene compound of the Formula IV

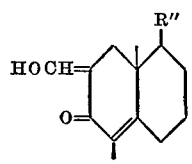

where R''' is t-butoxy, tetrahydropyranyloxy or ethylenedioxy, is then treated with N-methylaniline, preferably in a lower alkanol, to give the corresponding N-methylanilinomethylene compound represented by Formula V

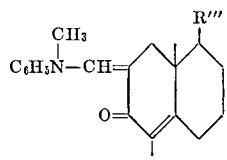

wherein R''' is as defined above. Alkylation of the thus prepared N-methylanilinomethylene compound with a meta-substituted benzylhalide, preferably of the formula:

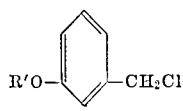

wherein R' is lower alkyl, benzyl or methoxymethylene at an elevated temperature and in the presence of an alkali metal hydride yields the compound of Formula VI.

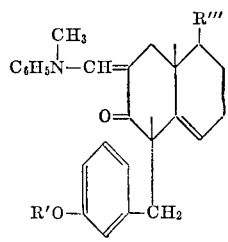

wherein R' and R''' are as described above. Generally, the reaction is carried out at an elevated temperature in an inert atmosphere. The blocking group, i.e., the N-methylanilinomethylene group, is readily removed from the Formula VI compound by hydrolysis under strongly alkaline conditions to give the unblocked compound of Formula VII.

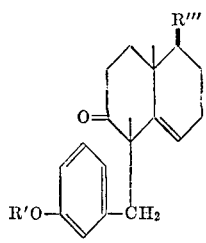

wherein R''' and R' are as defined above. This reaction is generally, most advantageously, carried out at an elevated temperature in the presence of an inert organic solvent such as a glycol ether. Acid hydrolysis of the Formula VII compound where R''' is ethylenedioxy and R' is methyl, yields the diketone dipicted by Formula VIIIa.

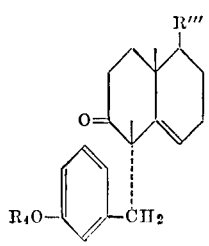

where R''' is oxygen and $R_4$ is methyl. Whereas, acid hydrolysis of the Formula VII compound, where R''' is t-butoxy or tetrahydropyranyloxy and R' is methyl, produces the 5β-hydroxy compound of Formula VIIIb wherein $R_4$ is methyl. Alternatively, to prepare Formula VIIIb compounds in which R''' represents OH and $R_4$ is methyl, the diketone can be reduced with hydrogen at an elevated temperature and under superatmospheric pressure in the presence of platinum catalyst. Alternatively, to prepare Formula VIII compounds in which R''' represents OH and $R_4$ is methyl, the diketone can be reduced with sodium borohydride in a lower alkanol. Using a palladium catalyst in ethanol, reduction of the Formula VII compound wherein R''' is ethylenedioxy and R' is benzyl, yields the Formula VIIId compound in which R''' is ethylene dioxy and $R_4$ is hydrogen.

The compounds represented by Formula VIII are also prepared directly from the compounds represented by Formula III, synthesis diagram hereinafter, wherein R''' is tetrahydropyranyloxy, t-butoxy or ethylenedioxy by treatment thereof with a meta-substituted benzyl halide preferably of the formula:

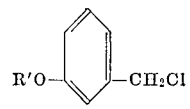

wherein R' is lower alkyl, benzyl or methoxymethylene in the presence of a strong base such as potassium t-butoxide or sodium hydride in an inert solvent such as t-butanol or dimethoxyethane.

As shown in the synthesis diagram, the Formula VIII compounds are then converted into compounds of the present invention having the formulas:

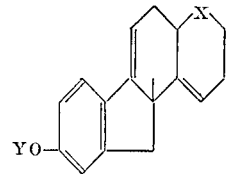

wherein X represents a member selected from the group consisting of

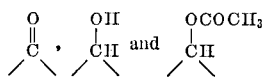

and Y is H, —CH₃ or —COCH₃.

Compounds of this structure are identified in the synthesis diagram as compounds a. They are prepared by the methods hereinafter described and are readily reduced with hydrogen in the presence of a catalyst to compounds of Formula b

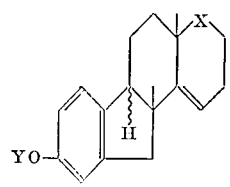

wherein X and Y are as described imediately above. The reactions are preferably carried out in the presence of an organic solvent such as ethanol.

Reduction of Formula b compounds, employing hydrogen and a palladium catalyst yields the compounds of Formula c

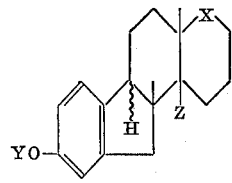

wherein X and Y are as described above and Z is hydrogen, cis or trans to the $C_{13}$ methyl group.

The following synthesis diagram describes the structures of the compounds discussed hereinbefore as starting materials and modifications of compounds (a), (b), and (c) described hereinafter.

SYNTHESIS DIAGRAM

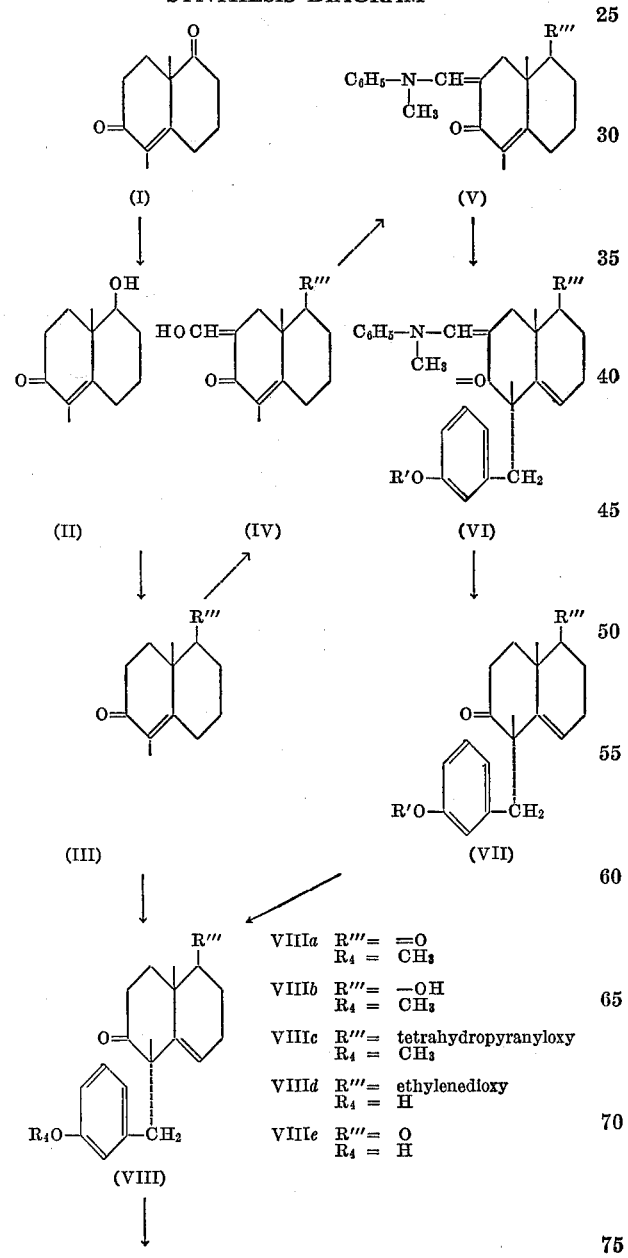

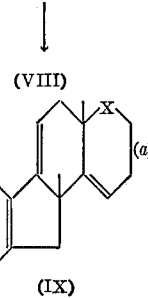

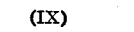

| | | |
|---|---|---|
| IXa | X= | \C=O |
| | Y= | /H |
| IXb | X= | \CH—OH |
| | Y= | /H |
| IXc | X= | \COCOCH₃ |
| | Y= | —C—CH₃ ‖ O |
| IXd | X= | \C=O |
| | Y= | C—CH₃ ‖ O |
| IXe | X= | \CHOH |
| | Y= | —C—CH₃ ‖ O |
| IXf | X= | \C=O |
| | Y= | CH₃ |
| IXg | X= | \CHOH |
| | Y= | CH₃ |
| IXh | X= | \C—OCCH₃ ‖ O |
| | Y= | CH₃ |
| IXi | X= | \C=O |
| | Y= | tetrahydropyranyl |
| IXj | X= | \CHOH |
| | Y= | tetrahydropyranyl |
| IXk | X= | \C—O—CCH₃ /H ‖ O |
| | Y= | tetrahydropyranyl |
| IXl | X= | \CO—CCH₃ ‖ O |
| | Y= | H |

| | | |
|---|---|---|
| Xa | X= | \C=O |
| | Y= | /H |
| Xb | X= | \CHOH |
| | Y= | /H |
| Xc | X= | \CO—CCH₃ ‖ O |
| | Y= | —CCH₃ ‖ O |
| Xd | X= | \C=O |
| | Y= | CCH₃ ‖ O |
| Xe | X= | \CHOH |
| | Y= | —CCH₃ ‖ O |
| Xf | X= | \C=O |
| | Y= | CH₃ |
| Xg | X= | \CO—CCH₃ ‖ O |
| | Y= | CH₃ |
| Xh | X= | \CHOH |
| | Y= | CH₃ |
| Xi | X= | \COC—CH₃ ‖ O |
| | Y= | H |

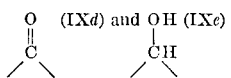

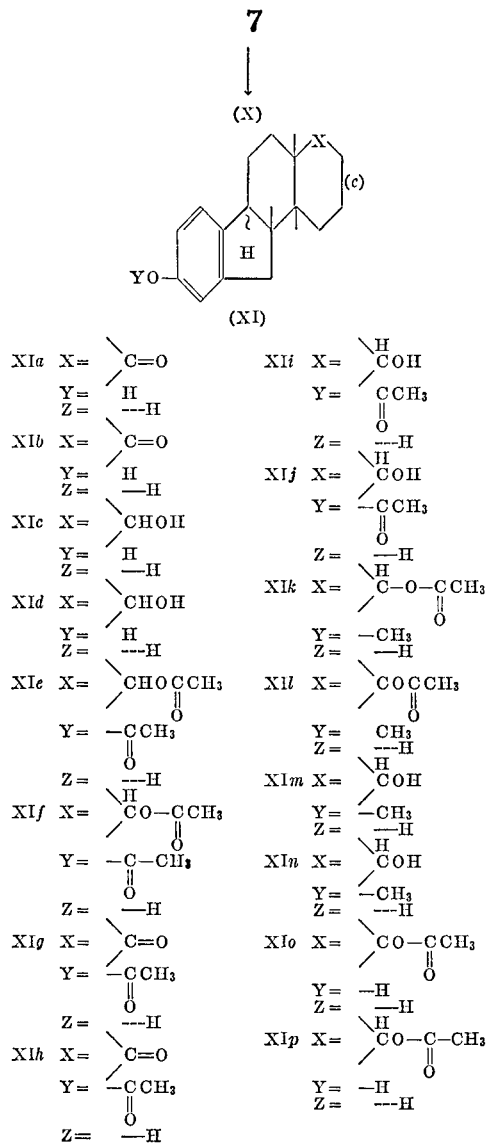

Now referring to synthesis diagram, the diketone of Formula VIIIc in which R''' is oxygen and R₄ is hydrogen, is prepared as described in Examples 21 and 22 below. This diketone is then converted to the tetracyclic ketone identified as (IXa) by treatment with hydrogen fluoride at subatmospheric temperature and extraction with organic solvent or by treatment with pholyphosphoric acid at room temperature and extraction with organic solvent. Ethyl ether, benzene and the like are well adapted to use in these reactions, more fully described in Example 23.

The tetracyclic ketone from (IXa) is then dissolved in a lower alkanol containing an alkali metal borohydride. The solution is acidified and extracted with an organic solvent such as ether, benzene or the like. The diol (IXb) is recovered from the mixture by evaporation of the solvent and treated with acetic anhydride and pyridine to yield the tetracyclic diacetate of Formula (IXc). The preparation is further delineated in Example 24.

Reduction of (IXa), (IXb), or (IXc) with hydrogen in the presence of a catalyst and solvent such as glacial acetic acid or ethanol yields the compounds of Formula Xb graphically illustrated in synthesis diagram and further reduction of this with hydrogen in the presence of palladium and ethanol at an elevated temperature gives the corresponding cis and trans isomers of Formula XIc, also illustrated.

By referring to synthsis diagram it can be seen that the tetracyclic ketone (IXa) and the diol (IXb) are converted to Formula a compounds in which X is $$\underset{C}{\overset{O}{\parallel}} \text{(IX}d\text{) and } \underset{CH}{\overset{OH}{|}} \text{ (IX}e\text{)}$$

respectively and L is CH₃OC— by treatment of said (IXa) or (IXb) with an alkali metal hydroxide and acetic anhydride. The reaction is preferably carried out in a lower alkanol such as thanol, isopropanol or the like. Catalytic reduction of the thus formed products yields the corresponding Formula Xb compounds (Xd) and (Xe) and further reduction of these yields the cis and trans isomer of Formula XIc; namely, (XIg), (XIh), (XIi) and (XIj).

To obtain the tetracyclic ketone of Formula (IXf) referred to in the synthesis diagram, the diketone (VIIIa), wherein R''' is O and Y is methyl, is treated either with polyphosphoric acid at room temperature or with liquid hydrogen fluoride at subatmospheric temperature. These reactions are subject of Example 25 below. Conversion of the thus prepared ketone to the cvorresponding acetate is readily achieved by reaction of said ketone with a hydride such as lithium aluminum hydride, sodium borohydride, potassium borohydride or the like to give the tetracyclic alcohol (IXg) which is then treated with acetic anhydride, preferably in the presence of pyridine to yield the acetate of Formula (IXh). The reaction is further elucidated in Example 26. The acetate of Example 26 is then reduced by treatment thereof with hydrogen in the presence of a catalyst. The reaction is preferably conducted in the presence of a solvent such as a lower alkanol or glacial acetic acid at about atmospheric pressure and yields the acetate (Xg). Further reduction of the acetate, at superatmospheric pressure and elevated temperature, yields the cis or trans acetates of Example 29. The cis isomer is shown as Formula XIk and the trans (XIl) on the synthesis diagram.

The latter compounds are also readily prepared by reduction of the tetracyclic ketone of (IXf), employing hydrogen and a catalyst, to form the Formula Xf compound.

Further reduction of this Formula Xf compound gives the alcohol (Xh) which is then acetylated to give the acetate of Formula Xg. The cis and trans isomers of Formulas XIk and XIl, respectively, are then obtained by the method described above.

Reduction of (IXg) in ethanol, with hydrogen in the presence of a catalyst yields the reduced product (Xh) shown in synthesis diagram and reduction of this product by the procedure of Example 29 yields the corresponding cis compound (XIm) and trans compound (XIn) isomers of compound (XIc).

Preparation of the Formula XIc compounds of the structure

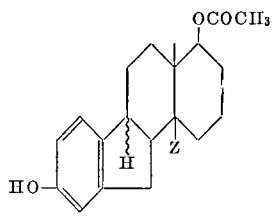

wherein Z is hydrogen, either cis or trans to the C₁₃ methyl group are obtained as shown in synthesis diagram. The tetracyclic ketone (IXa) is treated with dihydropyran and an acid catalyst in tetrahydrofuran or dioxan removing the hydroxyl group of (IXa) and substituting therefor the tetrahydropyranyloxy group. The product (IXi) is then treated with lithium aluminum hydride, or lithium, potassium or sodium borohydride to form the corresponding alcohol (IXj). The alcohol (IXj) is then subjected to treatment with acetic anhydride in pyridine yielding the acetylated product (IXk) from which the tetrahydropyranyl group is readily removed by acid hydrolysis. The Formula IX*l* compound thus prepared is readily reduced with hydrogen and a palladium catalyst in acetic acid or ethanol to give compound (X*i*), which if desired, further reduced to the cis compound (XI*o*) and trans compound (XI*p*) isomers by the procedure essentially as set forth in Example 29.

The compounds of the invention, as represented by Formulas *a*, *b* and *c* above, have substantial estrogenic and antiovulatory activity and are useful for controlling estrus cycle in domestic and laboratory animals such as rabbits, guinea pigs, rats, dogs, sheep, swine, cattle and the like. They may be administered orally or parenterally and are readily formulated as solid or liquid compositions.

Solid formulations may take the form of powders, tablets, pills, capsules or the like; and liquid compositions may be prepared as solutions, emulsions, suspensions, syrups and such. With small animals such as guinea pigs, rabbits and rats form about 0.03 to 10.0 mg./hd./day, is generally effective for blocking ovulation or obtaining an estrogenic response, and higher doses are usually required for larger animals.

Estrus synchronization in the breeding of livestock, domestic pets and laboratory animals has long been recognized by breeders as a most desirable achievement since synchronization coupled with fertilization of the ova would result in predictable control of reproduction. This would permit a breeder to regulate, to a substantial degree, the number of his flocks, herds or colonies and to coordinate the development of marketable animals with favorable market conditions. Such synchronization would also permit the breeder to make most effective use of his male animals and/or the services of a veterinarian where artificial insemination is to be employed.

EXAMPLE 1

Preparation of 4,4a,5,6,7,8-hexahydro-5β-hydroxy-1,4aβ-dimethyl-2-(3H)naphthalenone (II)

A solution containing 58.4 g. (0.304 mole) enedione (I) in 500 ml. absolute ethanol is cooled to 0° with stirring. Then 1.3 g. sodium borohydride is added to the solution and at 15 minute intervals, two more portions of 1.3 g. sodium borohydride is added. Fifteen minutes after the final addition, the solution is acidified with acetic acid and then the solvents evaporated. The residue is dissolved in chloroform, the organic phase washed with water, saturated sodium bicarbonate solution, dried and evaporated. The residue is distilled and recrystallized from ether-hexane and has melting point 79–80° C.

Calcd. for $C_{12}H_{18}O_2$ (percent): C, 74.19; H, 9.34. Found (percent): C, 74.17; H, 9.24.

EXAMPLE 2

Preparation of 5β - tert - butoxy - 4,4a,5,6,7,8-hexahydro-1,4aβ - dimethyl - 2 - (3H)naphthalenone (III—R′′′=t-butoxy)

To a solution containing 4.0 g. (0.0206 mole) of the alcohol (II) in 20 ml. dry methylene chloride at −20° in a pressure bottle is added approximately 20 ml. liquid isobutylene. Then 0.5 ml. catalyst (100% phosphoric acid saturated with boron trifluoride) is added, the pressure bottle closed and the mixture shaken at room temperature overnight. The bottle is cooled to −20°, opened and a stream of dry nitrogen passed through the solution to remove excess isobutylene. The residue is diluted with methylene chloride and washed thoroughly with a saturated sodium bicarbonate solution. The aqueous phase is re-extracted with methylene chloride and the combined organic phases dried and evaporated. The products from a total of four such experiments are combined to give 24.1 g. of oil. This is dissolved in hexane and passed through a short column of neutral alumina. After evaporation of the solvent, the residue weighs 20.85 g. The t-butyl ether has boiling point 120–122° C. at 0.3 mm., $n_D^{25}$ 1.5073.

EXAMPLE 3

Preparation of 4,4a,5,6,7,8-hexahydro-1,4aβ-dimethyl-5β-tetrahydro - 2 - (3H)naphthalenone (III—R′′′=tetrahydropryanyloxy)

To a solution containing 1.94 g. (0.01 mole) of the alcohol (prepared in Example 1) in ml. dry tetrahydrofuran is added 2.5 ml. of pure dihydropyran followed by 2 drops of phosphorous oxychloride. After standing at room temperature for 4 hours, the solution is poured into saturated sodium bicarbonate solution, extracted with ether and the ether extract dried and evaporated. The residue consists of essentially pure tetrahydropyranyl ether. The infrared spectrum shows no residual hydroxyl group. Other strong acid catalysts such as hydrochloric, sulfuric and p-toluenesulfonic acid may replace the phosphorus oxychloride.

EXAMPLE 4

Preparation of 3′,4′,8′,8′a - tetrahydro - 5′,8′a - dimethylspiro[1,3 - dioxolane - 2,1′(2′H)naphthalen] - 6′(7′H-one (III—R′′′=ethylenedioxy)

To a mixture of 6 g. (3.13 mmoles) enedione (I), 10 ml. ethylene glycol in 180 ml. benzene is added 100 mg. p-toluenesulfonic acid. The solution is heated under reflux under a water separator for 2¼ hours. The cold solution is diluted with ether and washed with sodium bicarbonate solution, water and saturated brine. The residue is filtered through a plug of alumina in benzene and the solvent evaporated. Crystallization of the residue from hexane at 0° gives 4.6 g. ketal (62.5%), melting point 53–55° C.

EXAMPLE 5

Preparation of 3′,4′,8′,8′a-tetrahydro-7′-(hydroxymethylene) - 5′,8′a - dimethylspiro[1,3 - dioxolane - 2,1′(2′H-naphthalen]-6′(7′H)-one (IV—R′′′=ethylenedioxy In a five liter 3-necked flask equipped with stirrer, dropping funnel and nitrogen inlet, there is placed 100 g. (1.85 moles) sodium methoxide, 1,700 ml. benzene and through the dropping funnel, 265 ml. ethyl formate. After cooling in an ice-water bath, 127.4 g. (0.539 mole) of the ketal, prepared in Example 4, in 640 ml. benzene, is added at 0° and stirred overnight at room temperature. The mixture is cooled to 0° and 500 ml. of 2.5 M sodium dihydrogen phosphate solution added. A further 500 ml. phosphate solution, 500 ml. water and 500 ml. benzene is added and the aqueous phase separated. The organic phase is washed with water, dried and evaporated. The residue weighs 143 g. and has the above structure.

EXAMPLE 6

Preparation of 5β - tert - butoxy-4,4a,5,6,7,8-hexahydro-3-(hydroxymethylene) - 1,4aβ - dimethyl - 2(3H)naphthalenone (IV—R′′′=t-butyloxy)

In a flask equipped with stirrer, thermometer and dropping funnel with nitrogen inlet, is placed 111 g. (2.06 mole) of sodium methoxide and 1,900 ml. dry benzene. A nitrogen atmosphere is maintained throughout the reaction. Through the dropping funnel is then added 300 ml. ethyl formate in a stream. The mixture is cooled to 12° and 150.5 g. (0.6 mole) of the t-butyl ether (prepared in Example 2) in 700 ml. dry benzene is added dropwise and the mixture stirred overnight. The organic phase is then extracted with water and 2 N sodium hydroxide. The aqueous phases are acidified with 2.5 M sodium dihydrogen phosphate and extracted with ether. The ether extract is washed with water, dried and evaporated to give 164.2 g. of oil. The formyl compound is crystallized from n-propanol and has melting point 76–77° C.

Calcd. for $C_{17}H_{26}O_3$ (percent): C, 73.34; H, 9.41. Found (percent): C, 73.26; H, 9.42.

EXAMPLE 7

Preparation of 5β - tert - butoxy - 4,4a,5,6,7,8-hexahydro-1,4aβ-dimethyl-3-(N-methylanilinomethylene) - 2(3H) naphthalenone (V—R'''=t-butoxy)

To a solution containing 2.78 g. (10 mmoles) of the formyl compound (prepared in Example 6) in 10 ml. methanol is added 1.17 g. (11 mmoles) N-methylaniline. The mixture is warmed slightly and then allowed to stand at room temperature overnight. The solvent and excess aniline are removed under reduced pressure to leave 3.5 g. of orange-yellow oil. This material is crystallized from nitromethane and has melting point 77.5–79° C.

EXAMPLE 8

Preparation of 3',4',8',8'a - tetrahydro - 5',8'a - dimethyl-7' - (N - methylanilinomethylene)spiro[1,3 - dioxolane-2,1' - (2'H)naphthalen] - 6'(7'H)one (V—R'''=ethylenedioxy)

The formyl compound from Example 5 is dissolved in 900 ml. methanol and 296 ml. (293.2 g., 2.74 moles) of N-methylaniline added. After standing at room temperature, the crystalline product separates and is removed by filtration and washed with hexane. The solvents are removed under vacuum and finally high vacuum to remove excess N-methylaniline. The residue is triturated with 100 ml. of methanol and the crystalline product removed by filtration. The combined crystalline products weigh 165.35 g., melting point 152–153° C.

EXAMPLE 9

Preparation of 5 - tert - butoxy - 3,4,4a,5,6,7 - hexahydro-1a - (m - methoxybenzyl) - 1β,4αβ - dimethyl - 3 - (N-methylanilinomethylene) - 2 - (1H)naphthalenone (VI—R'''=t-butoxy; R'=CH₃)

To a solution containing 79.7 g. (0.217 moles) of the anilino compound (prepared in Example 7) in 850 ml. dry dimethoxyethane under dry nitrogen is added 24.6 g. of 54% sodium hydride (mineral oil suspension). The mixture is stirred and heated under reflux for 2.5 hours. After cooling the solution, 51.1 g. (0.32 mole) of m-methoxybenzyl chloride is added and the solution then refluxed. The reaction mixture is cooled in an ice-water bath and water cautiously added to destroy excess hydride. The solution is diluted with water, acidified with 2.5 M sodium dihydrogen phosphate and extracted twice with ether. The ether phase is washed twice with water, dried and evaporated. The residue (133.4 g.) is dissolved in hexane and the product crystallized at 0° C. Recrystallization from n-propanol gives product, melting point 120.5–121.5° C.

Calcd. for C₃₂H₄₁NO₃ (percent): C, 78.81; H, 8.47; N, 2.87. Found (percent): C, 78.62; H, 8.63; N, 2.77.

EXAMPLE 10

Preparation of 5'α - (m - benzyloxybenzyl) - 3',7',8',8'a-tetrahydro - 5'β,8'αβ - dimethyl - 7' - (N - methyl-anilinomethylene)spiro[1,3 - dioxolane - 2,1' - (2H) naphthalen] - 6' (5'H) - one (VI—R'''=ethylenedioxy and R'=benzyl)

To a solution containing 5.37 g. (0.0152 mole) of the N-methylanilino starting material (prepared in Example 8) in 50 ml. dry dimethoxyethane is added 1.72 g. of 54% sodium hydride (mineral oil suspension). The mixture is stirred and heated under reflux under nitrogen. Then, 3.89 g. (0.0167 mole) of the benzyl chloride in 15 ml. dry dimethoxyethane is added and refluxing continued. The mixture is cooled, water added cautiously followed by excess 2.5 M sodium dihydrogen phosphate. The solution is extracted with methylene chloride, washed with water, and saturated brine, dried and evaporated. The residue (9.4 g.) has infrared and nmr spectra consistent with the structure of the product and is used directly as described in Example 15.

EXAMPLE 11

Preparation of 3',7',8',8'a - tetrahydro - 5'a - (m - methoxybenzyl) - 5'β,8'αβ - dimethyl - 7' - (N - methyl-anilinomethylene)spiro[1,3 - dioxolane - 2,1'(2'H) naphthalen] - 6'(5'H) - one (VI—R'''=ethylenedioxy; R'=CH₃)

In a flask equipped with stirrer, dropping funnel and condenser with nitrogen inlet is placed 223.5 g. (0.632 mole) of the bicyclic compound (prepared in Example 8). Dry dimethoxyethane (2.5 liters) is added, followed by 71.7 g. of 54% hydride in mineral oil. The mixture is heated at reflux under nitrogen, then 147.6 g. (0.943 mole) of m-methoxybenzyl chloride added in a slow stream and refluxing. The reaction mixture is stirred and water added cautiously to decompose excess sodium hydride. The mixture is extracted with methylene chloride. The organic phase is collected and washed with water and saturated brine. After drying over sodium sulfate, the solvent is removed in vacuo and the residue crystallized from ether. The product is recrystallized from acetone-hexane to give a sample, melting point 140.5–142° C.

Calcd. for C₃₀H₃₅O₄N (percent): C, 76.08; H, 7.45; N, 2.96. Found (percent): C, 75.97; H, 7.59; N, 2.88.

EXAMPLE 12

Preparation of 5β - tert - butoxy - 3,4,4a,5,6,7 - hexahydro-1α - (m - methoxybenzyl) - 1β,4αβ - methyl - 2(1H) naphthalenone (VII—R'''=t-butoxy; R'=CH₃)

To a solution containing 74.9 g. (0.154 mole) of the anilino compound (prepared in Example 9) in 500 ml. 2 - ethoxyethanol is added a solution containing 146 g. potassium hydroxide in 500 ml. water. The mixture is heated at reflux under nitrogen, for seven hours, then cooled, diluted with water, acidified with 2.5 M sodium dihydrogen phosphate and extracted with ether. The ether extract is washed with water, dilute hydrochloric acid and water, dried and evaporated. The residual oil weighs 38.9 g. (68%), and has the indicated structure.

EXAMPLE 13

Preparation of 5'α[m - (methoxymethoxy)benzyl] - 3',-7',8',8'a - tetrahydro - 5'β,8'αβ - dimethyl - 7' - (N-methylanilinomethylene)spiro[1,3 - dioxolane - 2,1' (2'H)naphthalen] - 6'(5'H)one (VI—R'''=ethylene dioxy; R'=CH₃OCH₂)

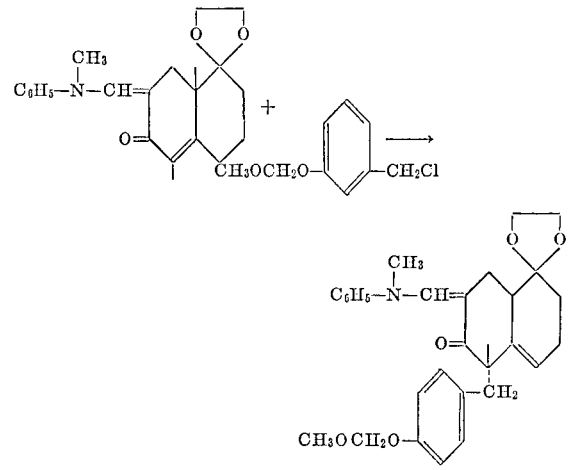

To a solution containing 3.53 g. (0.01 mole) anilino compound (prepared in Example 8) in 125 ml. dry dimethoxyethane under nitrogen, is added 1.11 g. sodium hydride (54% mineral oil suspension) and the mixture heated under reflux for 2.5 hours. The mixture is cooled and 2.8 g. (0.015 mole) of m-(methoxymethoxy)benzyl chloride added dropwise. The solution is heated under reflux for 2 hours, cooled and water added cautiously. The solution is further diluted with water and extracted

13 with ether. The ether extract is washed twice with water, dried and evaporated. The residue, an oil, is used without further purification.

EXAMPLE 14

Preparation of 3',7',8',8'a - tetrahydro - 5'α - (m - methoxybenzyl) - 5'β,8'αβ - dimethyl - spiro - [1,3 - dioxolane - 2,1'(2'H)naphthalen] - 6' - (5'H)one (VII—R'''=ethylenedioxy; R'=CH$_3$)

To a solution of 246.6 g. (0.521 mole) of the N-methylanilino compound (prepared in Example 7) in 1.7 liters of 2-ethoxyethanol is added a solution of 495 g. potassium hydroxide in 1.7 liters of water. The mixture is heated at reflux under nitrogen, cooled and permitted to stand overnight under nitrogen. The solution is diluted with water, extracted with ether, washed with 2N hydrochloric acid and water, then dried and the solvent evaporated in vacuo. The residue, 176 g. (94.8%) crystallizes completely to a yellow solid, melting point 85–86° C.

Calcd. for C$_{22}$H$_{28}$O$_4$ (percent): C, 74.13; H, 7.92.
Found (percent): C, 73.83; H, 7.88.

EXAMPLE 15

Preparation of 3',7',8',8'a - tetrahydro - 5'α - (m - benzyloxybenzyl) - 5'β,8'αβ - dimethyl - spiro - 1,3 - dioxolane - 2,1'(2'H) - naphthalen - 6' - (5'H) - one (VII—R'''=ethylenedioxy; R'=benzyl)

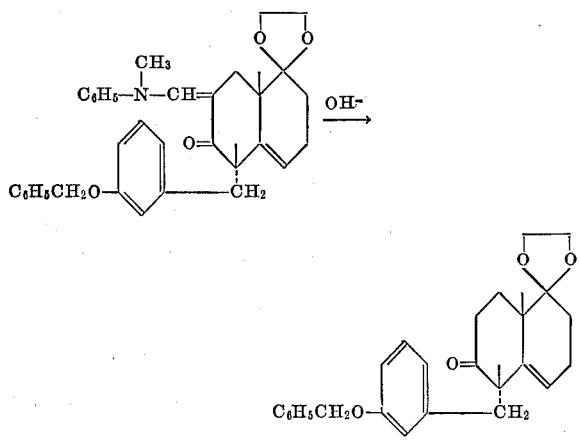

The crude alkylated product from 0.68 mole of compound (prepared in Example 10) is dissolved in 2.2 liters 2-ethoxyethanol and a solution containing 644 g. potassium hydroxide in 2.2 liters water added. The mixture is heated at reflux under nitrogen for 2 hours and then permitted to stand at room temperature overnight, diluted with water and extracted with ether. The extract is washed with water, cold, dilute hydrochloric acid, and water. The organic phase dried and evaporated. The residue is dissolved in 200 ml. ether and 400 ml. hexane added. After standing, the crystalline solid is removed by filtration and washed with ether. Recrystallization from ethanol gives the product, melting point 79–80° C.

Calcd. for C$_{28}$H$_{32}$O$_4$ (percent): C, 77.75; H, 7.46.
Found (percent): C, 77.98; H, 7.36.

EXAMPLE 16

Preparation of 3,4,4a,5,6,7 - hexahydro - 5β - hydroxy-1α - (m-methoxybenzyl) - 1β,4aβ - dimethyl - 2(1H) naphthalenone (VII—R'''—OH; R'=CH$_3$)

Gaseous hydrogen bromide is passed into 300 ml. chloroform at 0° for one hour. The t-butyl ether (34.8 g., 0.094 mole) prepared in Example 12 above in 200 ml. chloroform is then added and the mixture kept at 0° for one hour. The solution is washed with water followed by a saturated solution of sodium bicarbonate, dried and evaporated. The residue is dissolved in a mixture of ether and hexane and kept at 0° overnight. The solid which crystallizes is removed by filtration and washed with

14 hexane. It weighs 25.0 g. (84.6%), melting point 103.5–104° C.

EXAMPLE 17

Preparation of 3,7,8,8a-tetrahydro - 5α - (m - methoxybenzyl) - 5β,8aβ - dimethyl - 1,6(2H,5H)naphthalenedione (VIIIa)

To a solution of 85.7 g. (0.24 mole) of the ketal (prepared in Example 14) in 600 ml. ethanol is added 360 ml. 2 N hydrochloric acid and the mixture heated under reflux for one hour. The cooled solution is diluted with water and extracted with ether. The ether extract is washed with water, dried and the solvent evaporated. The residue weighs 74.0 g. (98.6%), boiling point 195° at 1 mm.

Calcd. for C$_{20}$H$_{24}$O$_3$ (percent): C, 76.89; H, 7.74.
Found (percent): C, 77.21; H, 8.05.

This material is crystallized from 95% ethanol, M.P. 50–51° C.

EXAMPLE 18

Preparation of 3,4,4a,5,6,7 - hexahydro - 5β - hydroxy-1α - (m-methoxybenzyl) - 1β,4aβ - dimethyl - 2(1H)-naphthalenone (VIIIb)

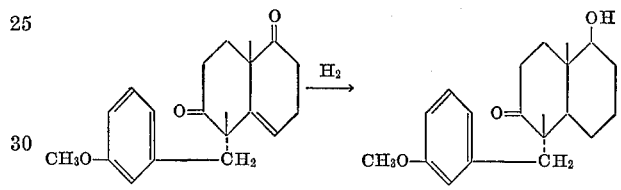

A solution of 2 g. of the diketone (prepared in Example 17) in 50 ml. ethanol is reduced catalytically with hydrogen at 75° C. and 50 p.s.i. pressure in the presence of 150 mgs. platinum oxide. After shaking overnight, the catalyst is removed by filtration and the solvent evaporated under reduced pressure. The residue is crystallized from ether hexane, then from acetone-hexane, giving the product, melting point 103.5–104° C.

Calcd. for C$_{20}$H$_{26}$O$_3$ (percent): C, 76.40; H, 8.34.
Found (percent): C, 76.47; H, 8.30.

EXAMPLE 19

Preparation of 3,4,4a,5,6,7 - hexahydro - 1α-(m-methoxybenzyl) - 1β,4aβ-dimethyl - 5β - [(tetrahydropyran-2-yl)oxy]-2(1H)naphthalenone (VIIIc)

To 2.78 g. (10 mmoles) unsaturated ketone (prepared in Example 3) in 50 ml. dry t-butanol is added 2.8 g. (25 mmoles) potassium t-butoxide and the mixture refluxed with stirring under nitrogen for 2 hours. The mixture is cooled to 20° C. and 1.88 g. (12 mmoles) m-methoxybenzyl chloride in 5 ml. dry t-butanol added. After stirring for one hour, the mixture is diluted with water and extracted with ether. The ether extract is washed with water, dried and evaporated to leave 5.1 g. of product which is used directly for the next step. In this reaction, the tetrahydropyranyloxy group in the starting material can be replaced by t-butoxy or ethylenedioxy to give the corresponding alkylated products. Similarly m-methoxybenzyl chloride may be replaced by m-benzyloxybenzyl or m-(methoxymethoxy)-benzyl chlorides to give the corresponding alkylated products.

EXAMPLE 20

Preparation of 3',7',8',8'a - tetrahydro - 5'a - (m-hydroxybenzyl)-5'β,8'aβ - dimethyl - spiro[1,3 - dioxolane-2,1' (2'H)naphthalen]-6'-(5'H)-one (VIIId)

A solution containing 18.6 g. of the benzyloxy compound (prepared in Example 15) in 200 ml. absolute ethanol is hydrogenated at room temperature and an initial pressure of 50 p.s.i. in the presence of 2 g. 5% palladium on carbon. The catalyst is removed by filtration and the solvent removed in vacuo. The residue crystallizes on trituration with ether. The yield of crystalline phenol is 5.9 g. which on recrystallization from 2-propanol and has melting point 155–156° C.

Calcd. for $C_{21}H_{26}O_4$ (percent): C, 73.66; H, 7.65. Found (percent). C, 73.86; H, 7.82.

EXAMPLE 21

Preparation of 3,7,8,8a - tetrahydro - 5α - (m-hydroxybenzyl) - 5β,8aβ - dimethyl - 1,6(2H,5H)naphthalenedione (VIIIe)

To 51.6 g. (0.151 mole) of the ketal (prepared in Example 20) in 300 ml. 95% ethanol is added 100 ml. 2 N hydrochloric acid and the mixture heated under reflux for 2.5 hours. After cooling, the mixture is diluted with water and extracted with ether. The ether is then dried and the solvent evaporated. The residue crystallizes completely to give 45.7 g. (100%) diketone. Recrystallization of this material from toluene gives the product, melting point 120.5–121.5° C.

Calcd. for $C_{19}H_{22}O_3$ (percent): C, 76.48; H, 7.43. Found (percent): C, 76.32; H, 7.40.

EXAMPLE 22

Preparation of 3,7,8,8a-tetrahydro - 5α - (m - hydroxybenzyl) - 5β,8aβ - dimethyl - 1,6(2H,5H)-naphthalenedione (VIIIe)

To a solution containing 3.53 g. (0.01 mole) anilino compound (prepared in Example 8) in 125 ml. dry dimethoxyethane under nitrogen was added 1.11 g. sodium hydride (54% mineral oil suspension) and the mixture heated under reflux for 2.5 hours. The mixture was cooled and 2.8 g. (0.015 mole) of m-(methoxymethoxy)benzyl chloride added dropwise. The solution was heated under reflux for 2 hours, cooled and water added cautiously. The solution was further diluted with water and extracted with ether. The ether extract was washed twice with water, dried and evaporated. The residue, an oil, was used without further purification.

The above crude alkylated product is dissolved in 28 ml. 2-ethoxyethanol and a solution containing 8 g. potassium hydroxide in 28 ml. water added. The solution is refluxed under nitrogen for 6 hours. The cooled solution is diluted with water and extracted with ether. The ether extract is washed successively with water, 2 N hydrochloric acid, water and saturated brine, dried and evaporated. The residue, 3′,7′,8′,8′a-tetrahydro-5′α[m-(methoxymethoxy)benyl]-5′β,8′aβ-dimethyl-spiro[1,3 - dioxolane-2,1′(2′H)-naphthalen]6′(5′H)-one, an oil, is used without further purification.

The crude product above is dissolved in a mixture of 100 ml. ethanol and 20 ml. 2 N hydrochloric acid and the solution heated under reflux for 3 hours. The cooled mixture is diluted with water and extracted with ether. The ether is then extracted twice with 2 N potassium hydroxide solution. The basic extracts are combined and acidified with concentrated hydrochloric acid. The ether extract is washed with water, dried and evaporated and the residue crystallied from toluene to give the crystalline phenol identical with that prepared in Example 21.

EXAMPLE 23

Preparation of 3-hydroxy-8β-methyl-D-homo-N-nor-estra-1,3,5(10),9(11),14-pentaen-17a-one (IXa)

(A) To about 2 ml. liquid hydrogen fluoride stirred and cooled in an ice-water bath, is added one g. of the diketone (prepared in Example 22). After stirring, the reaction mixture is diluted with ether and water. The organic phase is washed with water, saturated sodium bicarbonate solution, dried and evaporated. The residue is crystallized from acetonitrile to give 600 mgs. tetracyclic product, melting point 182–185° C. This product very often crystallizes in two distinct crystalline forms from the same solution and have quite different Nujol mull spectra.

(B) To about 25 g. of polyphosphoric acid is added 1.0 g. (2.5 mmoles) of the diketone (prepared in Example 22) in 2 ml. warm benzene. The mixture is stirred vigorously, excess ice is added followed by water and methylene chloride. The organic phase is then washed with water, dried and evaporated. The residue on trituration with ether crystallizes to give 300 mgs. tetraacyclic product, melting point 175–177° C. Treating the thus formed product with acetic anhydride and pyridine at room temperature yields the acetylated product, 3-hydroxy-8β-methyl-D-homo-B-nor - estra - 1,3,5(10),9(11), 14-pentaen-17a-one acetate.

On further treatment of this compound with hydrogen in the presence of a palladium catalyst on carbon in ethanol yields the reduced product having the formula:

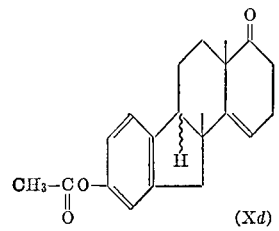

(Xd)

further reduction of this product employing palladium catalyst on carbon in ethanol at an elevated temperature, preferably about 75° gives the cis and trans isomers

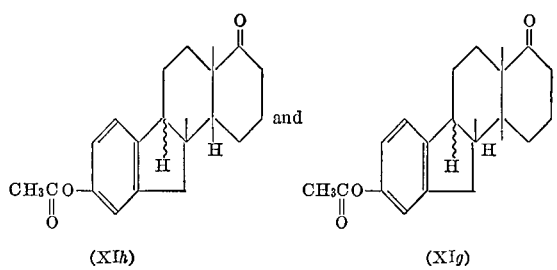

(XIh)      (XIg)

Also, direct reduction of the product 2,3,4a,5,11,11a-hexahydro-9-hydroxy-4aβ,11aβ - dimethyl-4H-benzo[a]fluoren-4-one using hydrogen and a palladium catalyst on carbon, yields the hydrogenated product

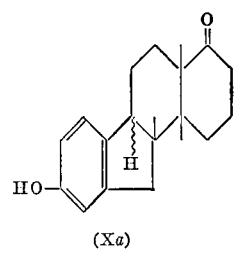

(Xa)

The reaction is generally most successfully carried out in an organic solvent such as ethanol or the like. Still further reduction with hydrogen in the presence of palladium catalyst and ethanol at an elevated temperature (75° C.) yields the cis and trans isomers:

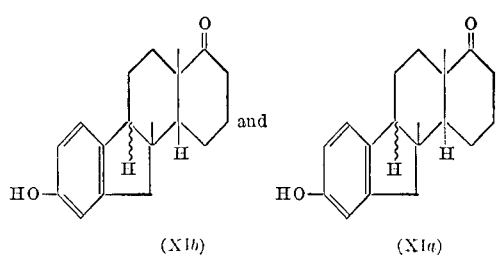

(XIh)      (XIa)

EXAMPLE 24

Preparation of 8β-methyl-D-homo-B-nor-estra-1,3,5(10), 9(11),14-pentaene-3,17aβ-diol diacetate (IXc)

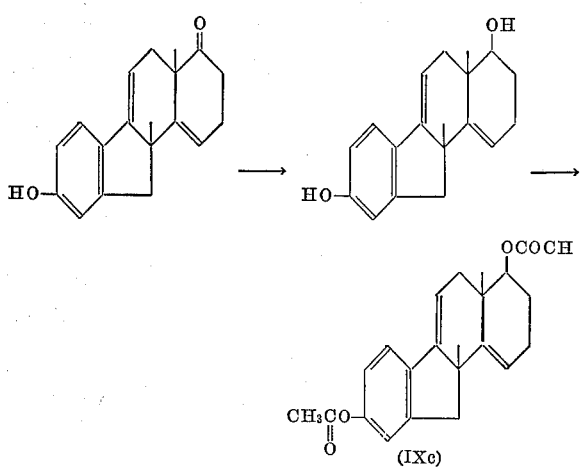

To a solution containing 5.6 g. (20 mmoles) of the ketone (prepared in Example 23) in 150 ml. absolute ethanol is added 4.0 g. sodium borohydride. The mixture is stirred at room temperature for 3 hours. The solution is diluted with water, acidified with dilute hydrochloric acid and extracted with ether. The ether extract is then washed with water, dried and evaporated. The residue, an oil, whose infrared spectrum showed no carbonyl absorption, is converted directly to the diacetate. The crude diol above is dissolved in 40 ml. acetic anhydride and 5 ml. pyridine. After standing at room temperature overnight, the solvents are removed at reduced pressure. The residue is dissolved in ether and the ether washed successively with water, dilute hydrochloric acid, water and saturated sodium bicarbonate solution, dried and evaporated. The residue is triturated with ether to give a crystalline product which is filtered and washed with cold methanol. The yield of diacetate 5.35 g., melting point 132–135° C. The analytical sample has melting point 139–140° C. Reduction of the diacetoxy compound using hydrogen and a palladium catalyst on carbon, in the presence of ethanol as a solvent gives the reduced product

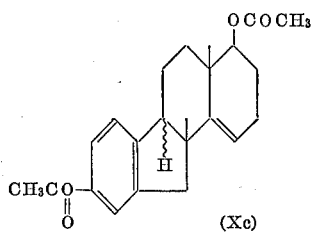

and reduction of the dihydroxy compound, above, under similar conditions yields the product

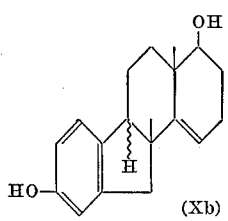

still further reduction with palladium catalyst and hydrogen gives the cis and trans isomers

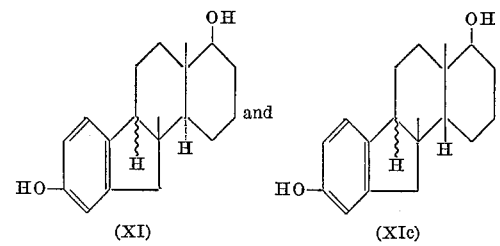

as graphically illustrated in synthesis diagram.

EXAMPLE 25

Preparation of 3-methoxy-8β-methyl-D-homo-B-nor-estra-1,3,5(10),9(11),14-pentaen-17a-one (IXf)

(A) A solution of 15 g. of the diketone (prepared in Example 17) in 22 ml. benzene is added to 560 g. polyphosphoric acid at 40° with vigorous stirring. After five minutes, ice is added and when all the polyphosphoric acid has dissolved, the mixture is further diluted with water and extracted with ether. The ether extract is washed twice with water, dried and evaporated. The residue is crystallized from ethanol to give 9.7 g. tetracyclic product, melting point 114–115° C.

Calcd. for $C_{20}H_{22}O_2$ (percent): C, 81.60; H, 7.53. Found (percent): C, 81.69; H, 7.34.

(B) To 25 ml. of liquid hydrogen fluoride maintained at 0° is added portionwise with stirring 17 g. (54.4 mmoles) of the diketone (prepared in Example 17). After stirring cold methylene chloride is added, the methylene chloride washed with water and then saturated sodium bicarbonate solution. The organic phase is dried, and evaporated and the residue crystallized from 95% ethanol to give 8.5 g. tetracyclic product, melting point 108.5–113° C.

EXAMPLE 26

Preparation of 3-methoxy-8β-methyl-D-homo-B-nor estra-1,3,5(10),9(11),14-pentaen-17aβ-ol acetate (IXh)

To a solution of 3.5 g. (0.0119 mole) of the tetracyclic ketone (prepared by Example 25) in 55 ml. 95% ethanol is added 1.0 g. sodium borohydride. After standing at room temperature 1 hour a further 1 g. sodium borohydride is added. The mixture is allowed to stand with intermittent warming on the steam bath for two hours, then the solution is diluted with water, acidified with concentrated hydrochloric acid and extracted with ether. The extract is washed with water, saturated sodium bicarbonate solution, dried and evaporated. The residue, i.e., the crude alcohol, prepared above is dissolved in 25 ml. acetic anhydride and 6 ml. pyridine added. The solution is permitted to come to room temperature, the solvents removed under reduced pressure and the residue dissolved in ether, and washed successively with dilute hydrochloric acid, water and saturated sodium bicarbonate solution. The ether is dried and evaporated. The residue filtered through a plug of activated magnesium silicate in 1:1 benzene-hexane. After evaporating the solvent, the residue is crystallized from hexane to give 2.75 g., melting point 98–99° C.

Calcd. for $C_{22}H_{26}O_3$ (percent): C, 78.07; H, 7.74. Found (percent): C, 77.98; H, 7.91.

EXAMPLE 27

Preparation of 3-methoxy-8β-methyl-D-homo-B-nor-9ξ-estra-1,3,5(10),14-tetraen-17aβ-ol acetate (Xg)

A solution of 5.0 g. (0.015 mole) of the hexahydro tetracyclic acetate (prepared in Example 26) in 100 ml. glacial acetic acid is reduced with hydrogen at atmospheric pressure and room temperature in the presence of 400 mgs. 5% palladium on carbon. The catalyst is removed by filtration and the solvent evaporated under

19 reduced pressure in vacuo. Toluene is added to the residue and this is then evaporated. The residue is crystallized from hexane to give 4.4 g. product, melting point 99–101° C.

EXAMPLE 28

Preparation of 3 - methoxy-8β-methyl-D-homo-B-nor-9ξ-estra-1,3,5(10)14-tetraen-17a-one (X*f*) and 3-methoxy-8β - methyl - D - homo - B - nor - 9ξ - estra - 1,3,-5(10),14-tetraen17aβ-ol acetate (X*g*)

A solution of 1.2 g. (~4 mmoles) of the styrene (prepared in Example 25) in 40 ml. glacial acetic acid is reduced with hydrogen at room temperature and atmospheric pressure in the presence of 200 mg. 5% palladium on carbon. One hundred ml. are absorbed in 33 minutes. The catalyst is removed by filtration and the solvent evaporated in vacuo. The residue in 1:1 benzene-hexane is filtered through a plug of Florisil. After evaporating the solvent, the residue is crystallized from hexane to give 880 mgs. product (X*f*), melting point 110.5–113.5° C.

Calcd. for $C_{20}H_{24}O_2$ (percent): C, 81.04; H, 8.16. Found (percent): C, 81.31; H, 8.25.

Approximately 150 mgs. of ketone prepared above is then reduced by sodium borohydride and the crude alcohol acetylated to give 95 mgs. of acetate. The compound X*g* is shown graphically below:

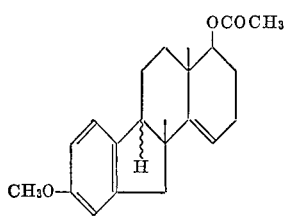

EXAMPLE 29

Preparation of 3-methoxy-8β-methyl-D-homo-B-nor-9ξ-estra-1,3,5(10)-trien-17aβ-ol acetate (XI*l*) and 3-methoxy - 8β - methyl - D - homo - B - nor - 9ξ,14β-estra-1,3,5(10)-trien-17aβ-ol acetate (XI*k*)

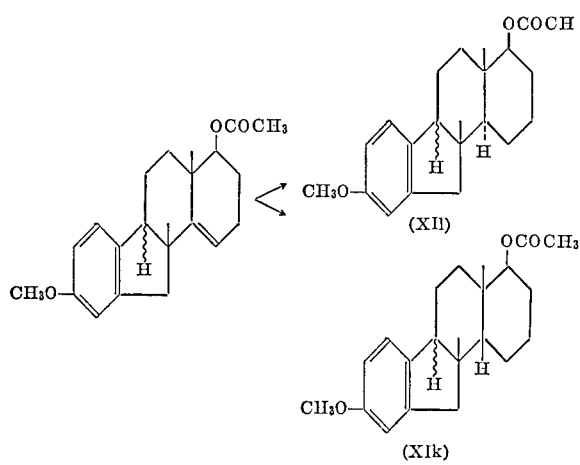

A solution containing 1.02 g. (3 mmoles) of the octahydroacetate (prepared in Example 28) in 54 ml. ethanol is hydrogenated at 75° C. at an initial pressure of 44.1 p.s.i. for three days. The solution is then cooled. The catalyst removed by filtration and the solvent removed under reduced pressure. The residue is dissolved in ether and filtered through a plug of activated diatomaceous earth to remove collodial catalyst. The ether is evaporated and the residue crystallized from hexane to give 223 mgs. (22%) of the trans-isomer, (XI*l*) melting point 162–162.5° C. Calcd. for $C_{22}H_{30}O_3$ (percent): C, 77.15; H, 8.83. Found (percent): C, 77.37; H, 8.66.

The mother liquors from above are evaporated. The residue dissolved in 25 ml. ethanol and 25 ml. 2 N potassium hydroxide added. The mixture is heated under reflux for two hours. The solution is then cooled, poured into water and extracted with ether, washed with water, dried and evaporated. The residue is crystallized from pentane to give 444 mgs. (49%) of the cis-hydroxy compound (XI*m*), melting point 95–96° C. Hydrolysis of the trans acetate (XI*l*) as above then gives the corresponding alcohol (XI*h*).

Acetylation of the cis-hydroxy compound (XI*m*) with acetic anhydride in pyridine gives the corresponding acetate (XI*k*) melting point 114–115° C. Calcd. for $C_{22}H_{30}O_3$ (percent): C, 77.15; H, 8.83. Found (percent): C, 77.04; H, 8.98.

EXAMPLE 30

Preparation of diet

The diet employed in the following tests to determine the efficacy of the compounds of the invention as antiovulatory agents and as estrogenic substances is provided below.

DIET

Crude protein _____ (Min.) 24.0.%
Crude fat _____ (Min.) 4.0%.
Crude fiber _____ (Max.) 4.5%.

Ingredients

Animal liver meal, fist meal, dried whey, corn and corn and wheat flakes, ground yellow corn, ground oat groats, dehulled soybean meal, wheat germ meal, wheat middlings, cane molasses, dehydrated alfalfa meal, soybean oil, brewers dried yeast, vitamin A palmitate, irradiated dried yeast (source of vitamin $D_2$), riboflavin, niacin, calcium pantothenate, chlorine chloride, D-activated animal sterol, a-tocopherol, thiamine hydrochloride, menadione sodium bisulfite (source of vitamin K activity), dicalcium phosphate, salt and traces of: manganous oxide, copper sulfate, iron carbonate, potassium iodate, cobalt sulfate and zinc oxide.

EXAMPLE 31

Antiovulatory test

Adult female rats of Wistar origin weighing approximately 170 to 180 grams each are used as the test animal. Starting on the day of vaginal estrus, test compounds are given by subcutaneous injections once daily for five successive days in 1 ml. of injection vehicle. The injection vehicle is:

0.5 gm. carboxymethylcellulose (low viscosity)
0.4 gm. Tween 80
0.9 gm. sodium chloride
10.0 ml. polyethylene glycol (Carbowax)
90.0 ml. distilled water Twenty-four hours after the last injection of test compound the rats are sacrificed and the uteri, oviducts and ovaries are removed. The oviducts and a small segment of the uterine horn are separated from the remainder of the uterine horn and ovaries. These oviducts are then flushed with physiological saline to determine if ova are present. A compound is considered to be antiovulatory if none of 6 treated female rats ovulate (have ova in the oviducts). All animals received a commercial laboratory animal ration ad libitum and fresh water is available at all times while on test. The following Table I summarizes antiovulatory testing data.

TABLE I

| Compound | Dose blocking ovulation, mg./rat/day |
|---|---|
| 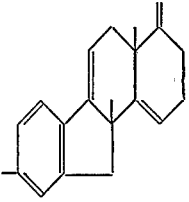<br>3-methyoxy-8β-methyl-D-homo-B-nor-estra-1,3,5(10),9(11),14-pentaene-17a-one. | 2.0<br>10.0 |
| 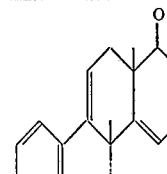<br>3-methoxy-8β-methyl-D-homo-B-nor-estra-1,3,5(10),9(11),14-pentaene-17aB-ol acetate. | 10.0 |
| 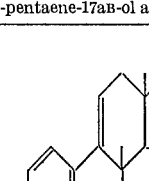<br>8β-methyl-D-homo-B-nor-estra-1,3,5-(10),9(11),14-pentaene-3,17β-diol diacetate (IXc). | 0.4<br>10.0 |

EXAMPLE 32

Estrogen assay

Immature female Wistar origin rats are 19 to 21 days of age and are employed as the test animal to determine estrogenic activity of candidate compounds. Test compounds are given by subcutaneous injections once daily for three successive days in 0.2 ml. of injection vehicle. This injection vehicle is:

0.5 gm. carboxymethylcellulose (low viscosity)
0.4 gm. Tween 80
0.9 gm. sodium chloride
10.0 ml. polyethylene glycol (Carbowax 300)
90.0 ml. distilled water Twenty-four hours after the third injection the rats are sacrificed, the uteri removed and disected free from the ovaries, oviducts and mesentery. Each uterine horn is split longitudinally and the uterine fluid blotted dry. The uteri are weighed to the nearest milligram on a balance. Ten rats are used for each tratment. Increased uterine weight over the control (untreated) uteri indicates estrogenic activity. All animals receive a commercial laboratory animal ration ad libitum and fresh water is available at all times while on test. The following Table II summarizes the estrogen assay testing data.

TABLE II

| Compound | Effective dose, mg./rat/day |
|---|---|
| 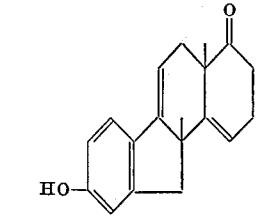 | 0.5 |
| 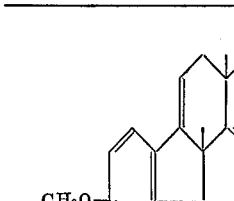 | 0.5<br>2.0 |
| 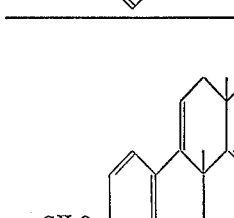 | 0.0<br>2.0 |
| 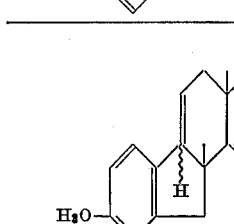 | 0.03<br>2.0 |
| 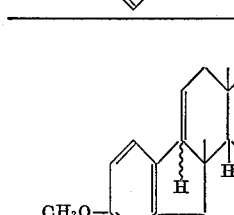 | 0.5 |
| 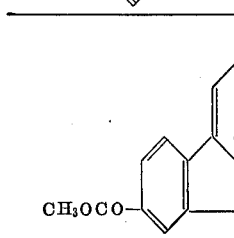 | 0.03<br>0.5 |

What is claimed is:
1. A compound selected from the group consisting of those represented by the Formulas a, b and c:
(a)

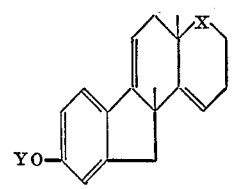

(b)

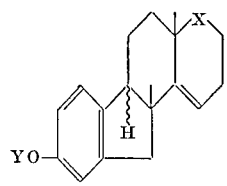

(c)

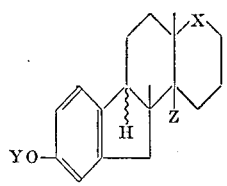

wherein X is a member selected from the group consisting of

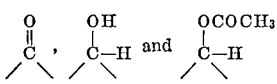

Y is a member selected from the group consisting of

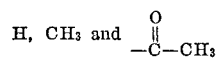

and Z is hydrogen either cis or trans to the $C_{13}$ methyl group.

2. A compound according to claim 1 (a), wherein X is

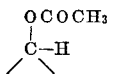

and Y is $CH_3$.

3. A compound according to claim 1 of the formula

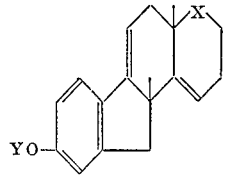

wherein X is selected from the group consisting of

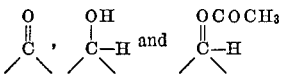

and Y is selected from the group consisting of

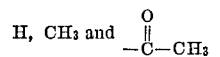

4. The compound according to claim 3, wherein X is

and Y is H.

5. The compound according to claim 3, wherein X is

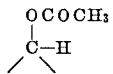

and Y is

6. The compound according to claim 3, wherein X is

and Y is $CH_3$.

7. A compound according to claim 1, of the formula:

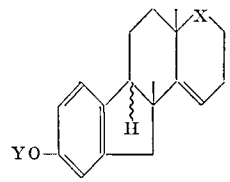

wherein X is selected from the group consisting of

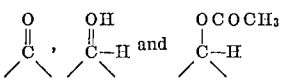

and Y is selected from the group consisting of

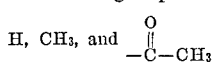

8. A compound according to claim 7, wherein X is

and Y is $CH_3$.

9. A compound according to claim 1, of the formula:

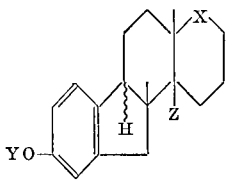

wherein X is selected from the group consisting of

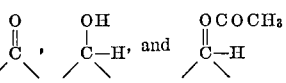

Y is selected from the group consisting of

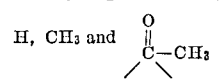

and Z is hydrogen cis or trans to the $C_{13}$ methyl group.

References Cited

UNITED STATES PATENTS 3,377,361    4/1968    Fare et al. _____ 260—479

JAMES A. PATTEN, Primary Examiner

U.S. Cl. X.R.

260—340.9, 345.9, 586, 590, 612, 613, 619; 424—311, 331, 340, 341, 343, 346